(12) United States Patent
Hahner et al.

(10) Patent No.: US 6,192,869 B1
(45) Date of Patent: Feb. 27, 2001

(54) FUEL TANK WITH FILLING LEVEL MEASUREMENT

(75) Inventors: Rainer Hahner; Rüdiger Walter, both of Bonn; Axel Wagner, Bonn-Beuel, all of (DE); Andreas G. R. Puempel, Essex; Lou Savoni, La Salle, both of (CA); Jim Siekmann, Crystal City, MO (US)

(73) Assignee: Kautex Textron GmbH & Co. KG., Bonn (DE)

( * ) Notice: Subject to any disclaimer, the term of this patent is extended or adjusted under 35 U.S.C. 154(b) by 0 days.

(21) Appl. No.: 09/360,677

(22) Filed: Jul. 26, 1999

(30) Foreign Application Priority Data

Jul. 27, 1998 (DE) .............................. 198 33 697

(51) Int. Cl.[7] .................................. F02M 37/04
(52) U.S. Cl. .................. 123/509; 137/565.24; 137/558
(58) Field of Search .................. 123/509, 510, 123/514; 73/113, 114, 224, 221; 137/565.34, 565.37, 558, 391, 565.17, 565.24

(56) References Cited

U.S. PATENT DOCUMENTS

| 3,470,907 | * | 10/1969 | Shokey . | |
| 3,780,582 | * | 12/1973 | Ajero | 73/320 |
| 4,694,857 | * | 9/1987 | Harris | 137/565 |
| 4,750,518 | * | 6/1988 | Griffin et al. | 137/565 |
| 4,790,185 | * | 12/1988 | Fedelem et al. | 73/317 |
| 5,038,741 | * | 8/1991 | Tuckey | 123/509 |
| 5,642,719 | * | 7/1997 | Brown | 123/509 |
| 5,992,394 | * | 11/1999 | Mukaidani et al. | 123/509 |
| 6,062,203 | * | 5/2000 | Takahashi et al. | 123/509 |

FOREIGN PATENT DOCUMENTS 196 50 244   6/1998  (DE) .

* cited by examiner

Primary Examiner—Carl S. Miller
(74) Attorney, Agent, or Firm—Seidel, Gonda, Lavorgna & Monaco, PC

(57) ABSTRACT

A fuel tank has a delivery unit which is arranged within the tank body and which has a reservoir. The delivery unit can be introduced into the tank body through a closable opening in the wall thereof. The tank further includes a filling level measuring device which is arranged outside the reservoir of the delivery unit and which can also be introduced into the tank body through the opening. The measuring device can be introduced into the tank body separately from the delivery unit and is held in its operative position by a holder mounted to the opening. The holder can be in the form of a ring mounted to the edge of the opening.

10 Claims, 2 Drawing Sheets

FUEL TANK WITH FILLING LEVEL MEASUREMENT

FIELD OF THE INVENTION

The present invention concerns a fuel tank, for example for a motor vehicle, and more especially a fuel tank having a filling level measuring device.

BACKGROUND OF THE INVENTION

A typical form of fuel tank, for example for a motor vehicle, comprises a tank body and a fuel conveyor or delivery unit which is arranged within the tank body. The delivery unit has an electric fuel pump by which fuel in the tank can be supplied to the engine of the motor vehicle. In such an arrangement the reservoir whose volume is substantially smaller than that of the fuel tank as a whole is to ensure in particular the function that, even under adverse operating conditions, for example when the motor vehicle in which the tank is fitted is negotiating a bend of considerable length or when the vehicle is not in a horizontal position, there is always a sufficient amount of fuel still in the region of the intake of the fuel pump so that the pump can still draw enough fuel and thus prevent the engine from suffering from fuel starvation. That presupposes the existence of a certain minimum amount of fuel in the reservoir and thus also presupposes that the reservoir itself is of a corresponding minimum volume.

In many cases, the tanks used comprise a thermoplastic material and they can preferably be formed in one piece by an extrusion blow molding procedure. In such a situation the delivery unit with the reservoir is frequently fitted into the tank body after production of the tank body, through an opening which is generally subsequently formed in the wall of the tank after manufacture thereof. As, for reasons of strength and stability and also sealing integrity in respect of the opening which is to be closed after the delivery unit has been fitted in the tank body, it is desirable for that opening to be kept as small as possible, a typical tank of such a configuration suffers from the disadvantage that the reservoir of the fuel delivery unit which is introduced into the tank body through the opening is of a correspondingly small volume which for example is of the order of magnitude of between 0.5 and 1 liter. In many cases, having regard to the duration of the above-mentioned adverse operating conditions which may occur in a practical context and during which only little or no fuel flows into the reservoir from the tank volume surrounding the reservoir, the above-mentioned small volume of the reservoir of the delivery unit is excessively small and thus inadequate for its intended purpose.

It will be noted here that under some circumstances the above-mentioned volume of the reservoir, which is small in any case for the reasons indicated above, may also be further reduced by virtue of the provision of a filling level measuring device which is mounted to the delivery unit on the outside thereof, for measuring the level of fuel in the main body of the tank which surrounds the reservoir. The filling level measuring device thus has to be introduced into the tank through the opening in the tank wall, jointly with the delivery unit. As the cross-section of the opening determines the available contour of the delivery unit and the measuring device may therefore not project outwardly substantially beyond that contour, it thus becomes necessary for the measuring device to be disposed within the contour of the delivery unit, that is to say, within the cross-sectional configuration thereof. That has the inevitable consequence that the volume of the reservoir is correspondingly reduced. Accordingly, the volume of the reservoir is still further smaller than the magnitude which is in any case predetermined by the cross-section of the opening in the wall of the tank body.

SUMMARY OF THE INVENTION

An object of the present invention is to provide a fuel tank which has a fuel reservoir therein, wherein the fuel tank is of such a configuration that the inclusion of a filling level measuring device does not necessarily result in a reduction in the volume of the reservoir.

Another object of the present invention is to provide a fuel tank having a filling level measuring device of such a configuration and arrangement that it also permits the inclusion of a reservoir whose cross-section can be enlarged within the tank perpendicularly to the longitudinal axis of the opening in the wall of the tank body without the reservoir and the filling level measuring device impeding each other.

Still a further object of the present invention is to provide a fuel tank for example for a motor vehicle which includes a reservoir for forming a reserve of fuel to prevent fuel starvation and a fuel level measuring device within the tank, wherein the tank and its related components can be readily assembled in a simple operating procedure.

Yet a further object of the present invention is to provide a fuel tank which includes a fuel reservoir and a fuel level measuring device, wherein the reservoir and the fuel level measuring device can be readily incorporated in the tank and securely held therein.

In accordance with the principles of the present invention the foregoing and other objects are attained by a fuel tank, for example for a motor vehicle, comprising a tank body and a delivery unit which is arranged within the tank body. The delivery unit includes a reservoir for constituting a reserve supply of fuel and can be introduced into the tank body through a closable opening in the wall thereof. The tank further includes a filling level measuring means arranged outside the reservoir in the tank, for measuring the level of fuel in the tank body. The measuring means can also be introduced into the tank body through the closable opening in the wall thereof and it is held in its operative position by a holding means. The filling level measuring means can be introduced into the tank body separately from the delivery unit and is held in its operative position by the holding means which is mounted at the closable opening in the tank wall.

As will be appreciated in greater detail from the description hereinafter of a preferred embodiment of the invention, the fact that the measuring means is separate from the delivery unit and can be introduced into the tank body separately from the delivery unit makes it possible for the two components, that is to say the delivery unit and the filling level measuring means, including the holding means for the latter, to be introduced into the tank body in succession and thus independently of each other, so that they can each be successively put into their respective operative position in the tank body. In that respect the arrangement according to the invention involves fewer limitations in terms of configuration and positioning and also the movements which are possibly to be performed by the fuel level measuring means in dependence on a variation in the level of fuel within the tank, than is the case when the measuring means is mounted to the delivery unit.

In a preferred feature of the invention, the holding means for mounting the filling level measuring means to the tank body is in the form of a ring mounted to the edge of the closable opening in the wall of the tank body. In that respect, it is possible for the measuring means to be mounted transversely with respect to the longitudinal axis of the opening in the tank wall at a spacing from the periphery of the opening. For that purpose it is only necessary for the holding means in the form of the ring for mounting the measuring means to be provided with at least one holding arm or the like holding portion, which extends for example substantially perpendicularly to the longitudinal axis of the opening in the tank body wall and which carries the fuel level measuring means at a spacing from the holding ring. That affords the possibility of the fuel level measuring means being positioned so far from the opening and thus the delivery unit which is introduced into the tank body through the opening that the reservoir can be expanded within the tank body to afford a larger volume in respect thereof, without the fuel level measuring means being in the way.

Further objects, features and advantages of the invention will be apparent from the description hereinafter of a preferred embodiment thereof.

DESCRIPTION OF THE PREFERRED EMBODIMENT

Figure 1:
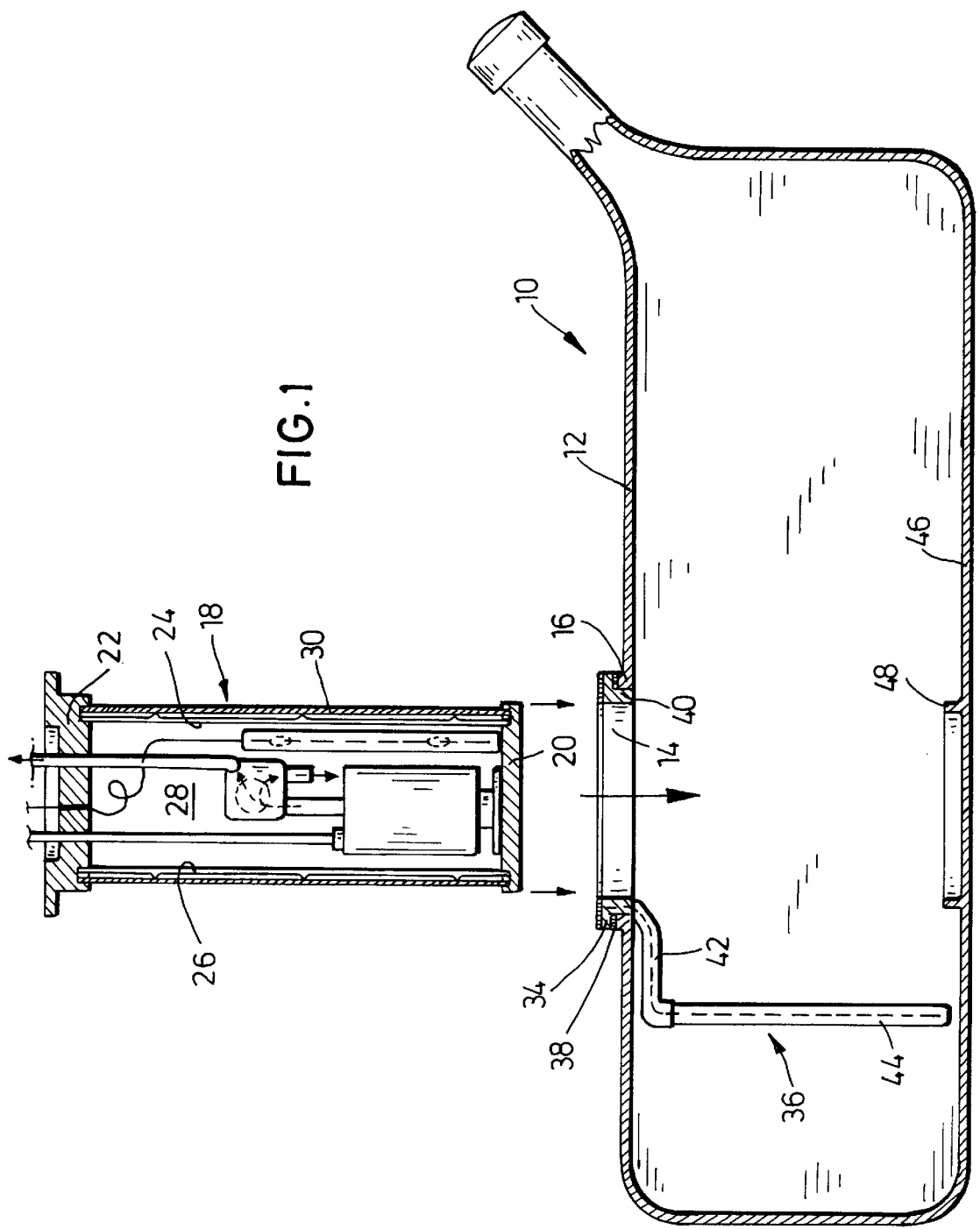
FIG. 1 is a view in longitudinal section through a fuel tank for example for a motor vehicle, with a fuel level measuring means or gauge arranged therein and showing the delivery unit for delivering fuel to the engine to be supplied with fuel, in a position before those components are introduced into the tank body.

Referring firstly to FIG. 1, reference numeral 10 therein generally denotes a fuel tank which is to be installed for example in a motor vehicle and which can be produced in any suitable fashion, for example in one piece from plastic material by an extrusion blow molding procedure. The tank 10 comprises a tank body whose upper wall is indicated by reference numeral 12, having an opening 14 which can be produced for example by cutting a suitable part of the wall out of same but which can also be formed in the tank body wall in any suitable fashion. In the embodiment illustrated in FIG. 1, mounted on the tank body is a short connecting portion or rim 16 which also serves the function of stiffening and reinforcing the tank body wall 12. The opening 14 is generally although not necessarily of a substantially circular cross-section. Through the opening, a previously prepared fuel conveyor or delivery unit generally indicated at 18 in FIG. 1 is fitted into the tank 10. The delivery unit 18 also includes a reservoir 28 for accommodating an adequate amount of fuel, the function thereof being essentially that of ensuring that the engine of the motor vehicle in which the tank 10 is installed is adequately supplied with fuel without an interruption in supply such as to cause for example fuel starvation.

Figure 2:
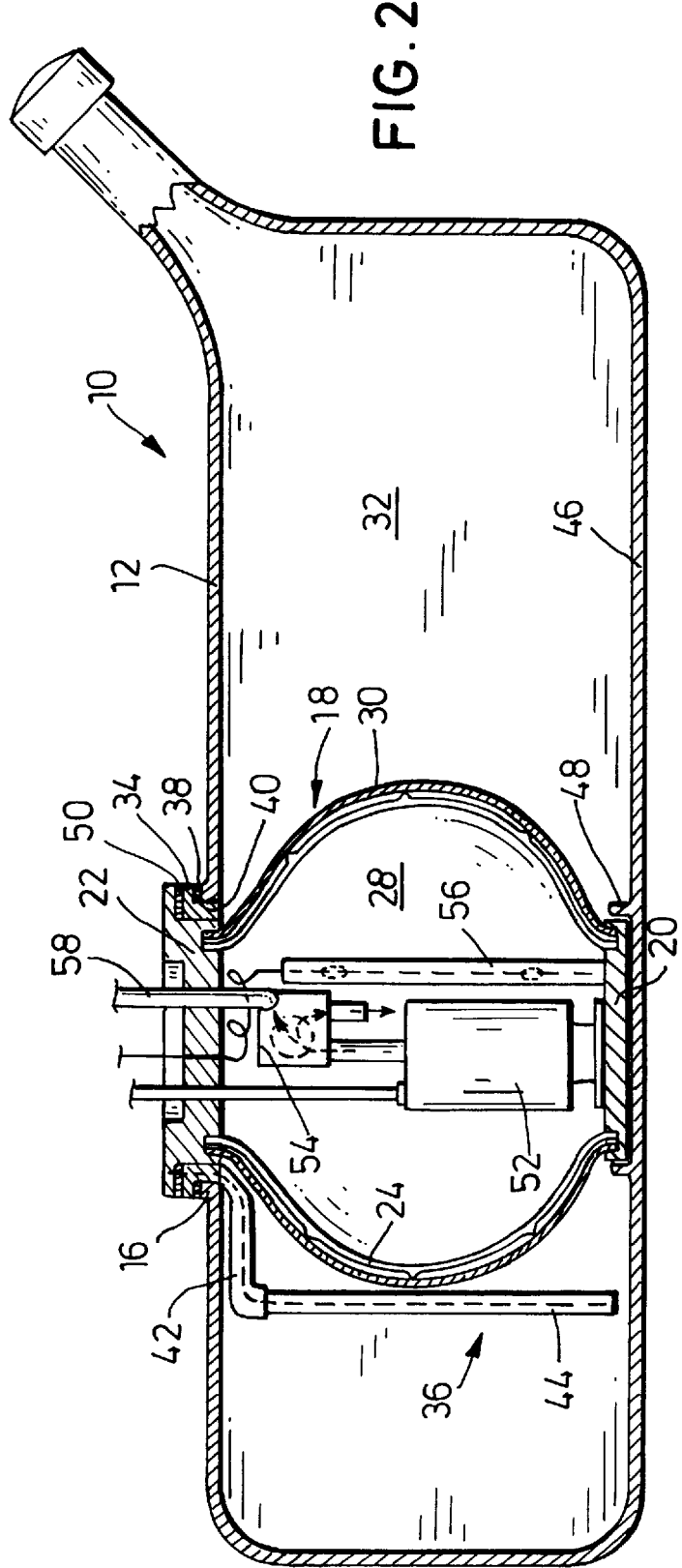
FIG. 2 is a view corresponding to FIG. 1 showing the reservoir and the delivery unit installed in the tank body in their operative position.

The delivery unit 18 is provided with a bottom portion 20 and a top portion 22 which respectively delimit the reservoir 28 at respective ends thereof. The two portions 20 and 22 are connected and held together by a support structure which is diagrammatically indicated at 24 and which comprises four or more bars or rods 16 of strong, elastically deformable material, for example spring steel or plastic material. The bars 26 are arranged in mutually displaced relationship through 90° over the periphery of the delivery unit 18 or the reservoir 28 which is approximately circular in cross-section. On the outside the support structure 24 is enclosed by a tubular portion 30 of preferably deformable material, for example rubber or plastic material. The portion 30 forms between the bottom portion 20 and the top portion 22 a deformable boundary wall defining the peripheral configuration of the reservoir 28 from which is taken the fuel which is fed to the engine (not shown). The portion 30 is sealingly connected both to the bottom portion 20 and also to the top portion 22 so that in its operative position within the tank body, as shown in FIG. 2, apart from the necessary feed and discharge lines for the fuel, the reservoir 28 is closed off with respect to the main space or chamber 32 which is formed in the tank 10, around the reservoir 28.

The delivery unit 18 with reservoir 28 is mounted in the tank 10 by a procedure whereby the delivery unit 18, starting for example from the position shown in FIG. 1, is introduced as a complete assembly in itself through the opening 14 in the upper wall of the tank 10 into the tank 10. In that respect, the cross-section of the delivery unit 18 initially corresponds to the internal cross-section of a holding ring 34 which is fitted on to the connecting portion or rim 16 and which serves to hold in position a filling level measuring device which is diagrammatically indicated at 36. The filling level measuring device 36 is arranged in the tank space or chamber 32 surrounding the reservoir 28 and serves to measure the level of fuel in the tank space or chamber 32. It will be seen from FIG. 1 that the measuring device 36 has firstly been fitted into the tank through the opening 14 in the upper wall 12 thereof, in such a way that, in the operative position of the measuring device 36, the holding ring 34 rests on the connecting portion or rim 16 around the opening 14 in the top wall 12 of the tank 10, with the interposition of a sealing ring 38. An axial extension portion 40 of the holding ring 34 engages into the opening defined by the connecting portion or rim 16. The holding ring 34 when viewed in cross-section in a diametral plane for example thus has two limbs which extend substantially at a right angle to each other, that is to say, in a generally L-shaped configuration. In that respect, the extension portion or limb 40 can engage into a peripherally extending recess which is provided on the connecting portion or rim 16 at the inward side thereof and which is of a suitable cross-section for that purpose.

Mounted on the holding ring 34 is an arm 42 which extends substantially radially with respect to the longitudinal axis of the opening 14 and which at its free end carries the measuring device 36 which can be of a conventional configuration, for example in the form of a lever-type sender. Thus it is possible for the measuring device 36 to be mounted pivotably to the holding arm 42 when the measuring device is provided with a float (not shown) which is adapted to float on the surface of the fuel in the tank body, the angular position of a lever 44 which carries the float thus indicating the level of fuel in the tank. It is however also possible to use any other appropriate forms of level measuring device.

After the filling level measuring device 36 has been inserted into the tank body and after the holding ring 34 has been mounted to the connecting portion or rim 16 the delivery unit 18 which is of smaller cross-section than those components is introduced into the tank 10 through the holding ring 34 and fitted with its bottom portion 20 on to the bottom wall 46 of the tank 10. The bottom wall 46 of the tank 10 has a seat 48 in the form of an annular rib or ridge for forming a positively locking connection between the delivery unit 18 and more specifically the bottom portion 20 thereof and the bottom wall 46 of the tank body. When the bottom portion 20 of the delivery unit meets the bottom wall 46 of the tank body, the delivery unit 18 still projects upwardly beyond the tank through the opening 14 therein by a given distance as the axial extent of the delivery unit 18 in its initial condition as shown in FIG. 1 is greater than the spacing between the two mutually oppositely disposed walls 12 and 46 of the tank body. The spacing between the bottom portion 20 of the delivery unit and the top portion 22 thereof is reduced by downward movement of the top portion 22 until it assumes the position shown in FIG. 2 in which, with the interposition of a sealing ring 50, it rests on the upwardly facing face of the holding ring 34 for the measuring device 36, whereupon it is fixed to the tank body or to the connecting portion or rim 16 thereof in a suitable fashion, for example by means of a cap or union nut, a bayonet fixing or the like. The above-mentioned reduction in the distance between the bottom portion 20 and the top portion 22 of the delivery unit 18 at the same time causes deformation of the reservoir 28, in the course of which the bars 26 of the support structure 24 are deformed in an outwardly curved configuration as can be clearly seen from FIG. 2, and the tubular portion 30 forming the wall of the reservoir 28 is correspondingly expanded, with a reduction in its axial extent. In that expanded condition which represents the definitive operating condition of the delivery unit 18, the volume of the reservoir 28 extending from the bottom of the tank body to the top wall 12 thereof is markedly greater at least in the transverse direction than in the undeformed condition of the delivery unit 18 shown in FIG. 1. In the operative condition the top portion 22 of the delivery unit 18 at the same time forms the closure means for closing the closable opening 14.

The parts which are arranged within the reservoir 28, that is to say more particularly an electric fuel pump as indicated at 52, a pressure regulator 54 and a filling level measuring device 56 within the reservoir 28 are not directly related to the present invention so that they do not need to be described in detail herein. It will be appreciated that the delivery unit 18 is such that the fuel can flow into the reservoir 28 from the tank space or chamber 32 surrounding same. The engine of the motor vehicle is supplied with fuel by way of a line 58 which is passed in fluid-tight relationship through the top portion 22, like also the other lines such as electric lines which are connected to the assembly.

It will be appreciated that separation of the filling level measuring device 36 which is outside the reservoir 28, from the delivery unit 18, affords the advantage that the volume of the reservoir 28 is not substantially reduced by providing the filling level measuring device 36. Admittedly, it is possible under some circumstances, in dependence on the configuration of the co-operating parts, for the holding ring 34 to cause a reduction in the size of the opening 14 in the top wall 12 of the tank body so that consequently the cross-section of the delivery unit 18 in its starting condition as shown in FIG. 1 will also have to be of a corresponding dimension. However, a reduction caused thereby in the volume of the reservoir 28 is negligible in comparison with prior designs in which the filling level measuring device disposed outside the reservoir is mounted to the delivery unit, with the necessary consequence that the contour of the delivery unit has to be appropriately adapted to that overall configuration. Furthermore the present invention affords the possibility of the holding arrangement and in particular the arm 42 being of such a design or dimension that the filling level measuring device 36 is disposed not only outside the contour of the delivery unit 18 but also independently thereof at a spacing from the delivery unit 18 so that, as in the case of the embodiment illustrated in the drawing, the delivery unit 18 can experience an expansion after it has been introduced into the tank, without any need to have regard to the presence of the measuring device 36, in consideration of the distance at which the measuring device 36 is disposed from the delivery unit 18. The use of the teaching in accordance with the present invention thus allows a greater degree of freedom in terms of the arrangement and configuration of the delivery unit and the fuel level measuring device. Furthermore the present invention affords the above-indicated advantages without the need to tolerate complication of the design arrangement. On the contrary the use of the teaching in accordance with the invention affords a clear arrangement and ease of handling upon assembly, while the individual parts making up the arrangement according to the invention, that is to say more especially the delivery unit 18 including the reservoir 28 and the level measuring device 36 can each in themselves be of a simpler and clearer configuration than when involving a combination of those parts such that the level measuring device were mounted to the delivery unit.

It will be noted that the delivery unit 18 and/or the holding ring 34 may be provided with indexing means, for example projections, recesses and the like, which co-operate with each other and/or with corresponding recesses or projections respectively on the connecting portion or rim 16 of the tank body, in order to fix a given relative position of the components with respect to each other in the peripheral direction of the connecting portion 16.

It will be appreciated that the above-described embodiment of the present invention has been set forth solely by way of example and illustration of the principles thereof and that various modifications and alterations may be made therein without thereby departing from the spirit and scope of the present invention.

What is claimed is:
1. A fuel tank comprising
   a tank body having a wall, the tank body wall defining a closable opening therein,
   a delivery unit within the tank body and including a reservoir for fuel and adapted to be introduced into the tank body through the opening in the tank body wall for installation of the delivery unit in the tank body,
   a filling level measuring means arranged outside the reservoir in the tank body for measuring the fuel filling level in the tank body, the measuring means also being adapted to be introduced into the tank body through the opening in the tank body wall separately from said delivery unit, and
   a holding means holding the filling level measuring means in the operative position thereof and mounted to said opening in said tank body wall.
2. A fuel tank as set forth in claim 1 including
   means for mounting the filling level measuring means movably to the holding means.
3. A fuel tank as set forth in claim 1 including
   means for mounting the filling level measuring means pivotably to the holding means.
4. A fuel tank as set forth in claim 1
   wherein the holding means is in the form of a ring, and further including
   means for mounting the ring to the edge of the opening in the tank body wall.
5. A fuel tank as set forth in claim 1 including
   means for mounting the filling level measuring means to the tank body at a spacing from the periphery of the opening in transverse relationship to the longitudinal axis of the opening.

6. A fuel tank as set forth in claim 5 wherein the holding means comprises a ring for holding the filling level measuring means and said ring includes at least one holding arm which carries the filling level measuring means at a spacing from the holding ring.

7. A fuel tank as set forth in claim 6 wherein the holding arm extends substantially perpendicularly to the longitudinal axis of the opening.

8. A fuel tank as set forth in claim 1 wherein the delivery unit with reservoir is adapted to be introduced into the tank body through the holding means for the filling level measuring means which is disposed at the opening in the tank body wall.

9. A fuel tank as set forth in claim 1 wherein the delivery unit is provided with an end closure portion which in the operative position of the components is supported by the holding means for the filling level measuring means and serves as a closure portion for said opening.

10. A fuel tank for a motor vehicle comprising a tank body having a wall, the tank body wall defining an opening through the tank body wall to form a communication between the interior of the tank body and the outside atmosphere, a delivery unit for the delivery of fuel from the tank, the delivery unit including a reservoir for accommodating a reserve amount of fuel and a pump for delivering fuel from said reserve amount, the delivery unit being installed into the tank body through the opening in the tank body wall, holding means mounted to said tank body wall at said opening for holding said delivery unit in its operative position of installation within the tank body, a measuring means for measuring the fuel level in the tank body, the measuring means being disposed outside said reservoir in said tank body and also being installed into said tank body through said opening in said tank body wall, and holding means for holding said measuring means in the operative position of installation thereof within the tank body, the arrangement being such that the delivery unit and the measuring means are installed as separate assemblies in said tank body.

* * * * *